United States Patent [19]

Bjurman

[11] 4,314,717
[45] Feb. 9, 1982

[54] RESILIENT SPRINKLER NIPPLE

[75] Inventor: James M. Bjurman, Salt Lake City, Utah

[73] Assignee: Multi-Flex Corporation, Salt Lake City, Utah

[21] Appl. No.: 150,306

[22] Filed: May 16, 1980

[51] Int. Cl.³ .............................................. F16L 55/00
[52] U.S. Cl. ........................................ 285/5; 285/226; 285/235; 285/390; 285/423; 138/121; 239/201; 239/588
[58] Field of Search ................. 285/5, 226, 235, 236, 285/355, 390, 423, 333, 334, 260, 61; 239/201, 207, 229, 588; 138/121, 109, 177

[56] References Cited

U.S. PATENT DOCUMENTS

| | | | |
|---|---|---|---|
| 720,578 | 2/1903 | Greenfiek | 285/390 X |
| 2,582,249 | 1/1952 | Hendel | 285/226 |
| 2,752,195 | 6/1956 | Whitehead | 239/229 |
| 2,807,478 | 9/1957 | Hermann et al. | 285/227 X |
| 3,313,319 | 4/1967 | Osburn et al. | 285/226 |
| 3,597,517 | 8/1971 | Smith | 138/121 |
| 3,759,445 | 9/1973 | King | 285/236 |
| 3,796,103 | 3/1974 | Winfield | 285/226 |
| 4,033,615 | 7/1977 | Miller et al. | 285/390 |
| 4,165,110 | 8/1979 | Itzler | 228/226 |
| 4,179,142 | 12/1979 | Schopp | 285/423 |

Primary Examiner—Dave W. Arola
Attorney, Agent, or Firm—Cook, Wetzel & Egan, Ltd.

[57] ABSTRACT

A flexible plastic nipple for coupling a sprinkler head to a sprinkler system pipeline. The nipple includes an elongated plastic tube having a resilient center section and a pair of end sections. The center section has a uniform set of annular undulations which provides both rigidity and flexibility to the nipple. Each end section includes a rigid portion, a flexible threaded section, and a snub portion for mating the nipple with a connector fitting on the sprinkler head or pipeline. The threaded portions have sufficient flexibility to prevent rupturing or stripping when a force is transmitted to the nipple. In addition, the center section will bend before the force transmitted to the threaded portions becomes excessive and will rebound to its original position when the excessive force is removed.

4 Claims, 4 Drawing Figures

RESILIENT SPRINKLER NIPPLE

BACKGROUND OF THE INVENTION

The present invention relates to nipples or risers for coupling a sprinkler head to a sprinkler system pipeline and, more particularly, to a single piece nipple which bends when an excessive deflecting force is applied to the sprinkler head or nipple from any direction and returns to an upright position as the deflecting force is removed.

Nipples or risers are utilized in many residential and commercial sprinkling systems to connect sprinkler heads to metal or plastic pipelines. A riser is typically coupled to a connector fitting in the pipeline such as a T-joint. Both the riser and the T-joint are susceptible to damage from the sprinkler head's exposure due to inadvertent contact by people, lawn equipment, vehicles, and the like. Sprinkler systems have been plagued with costly repairs and replacement from broken or leaking risers and joints which were too rigid to withstand day-to-day punishment. In addition, a person who inadvertently strikes or makes contact with a rigid riser may himself be injured. Further deterioration of a riser may result from extremely low temperatures and corrosion due to the prevailing weather conditions.

Newer risers have avoided some of the problems of rigidity by having a pipe or center section made from flexible material such as rubber with rigid threading or PVC pipe fittings connected at both ends thereof. Other risers have overcome this rigidity problem by providing a helical or coil spring to interact with a flexible, but not resilient, pipe, thereby enabling the pipe to return to an upright position. However, such springs are normally made of metal susceptible to deforming from contact with excessive deflective forces. When a spring becomes deformed, it must be replaced because the riser will no longer return to its proper, upright position. The springs may also break or oxidize under various weather conditions.

None of the previously mentioned risers have eliminated the inherent problem that their end portions and/or the correspondingly mated connector fittings of the sprinkler head or pipeline may still rupture from a heavy force transmitted into the fitting connection. In addition, a deflective force may strip or pull out the threaded end portion.

The replacement of risers or T-joints normally results in the area surrounding the sprinkler head being dug up. In addition, the removal of the broken riser or nipple can be difficult depending upon the state of the deteriorated riser.

SUMMARY OF THE INVENTION

The present invention provides a flexible and resilient sprinkler nipple having a main section and a pair of partially threaded end sections which is designed to bend or give in response to an excessive deflecting force and rebound to its original position as the deflection force is removed without damaging the nipple or system components. The design of the nipple works in conjunction with the material it is constructed from in order that the threaded sections will not strip, pull out or rupture when deflective forces are transmitted to the nipple. Such a nipple is especially desirable for application in high "traffic" areas such as schools, recreational parks, parkways, garden areas, playgrounds, and the like.

The resilient and flexible nipple is adapted to be mounted in a vertical or horizontal position to couple the sprinkler head to the sprinkler system pipeline. The flexible nipple may be affixed to all common sprinkler heads without the purchase of any additional adapters and, in most cases, can be installed without using any tools either.

The nipple consists of a single, molded plastic tubular piece. The center section has a set of uniform, annular undulations or convolutions which enables the nipple to be bent in any direction and return to its original position. Each end section includes a rigid portion, a flexible threaded section, and a snub portion. When the threaded section is mated within a connector fitting, the center portion is capable of yielding to deflective forces before the forces are sufficient to strip out the threaded section. The rigid section prevents the threaded section from collapsing during the center section's deflection. In the preferred embodiment, the threads of the threaded section are slightly oversized and the angle of pitch of each thread has been slightly narrowed. Furthermore, the threaded portion itself is shorter than the length of a standard, national pipe threading. These improvements create a better seal and minimize bottoming out by the nipple. Finally, a snub section is provided at the end of the threaded sections to minimize cross-threading.

DESCRIPTION OF THE PREFERRED EMBODIMENTS

Figure 1:
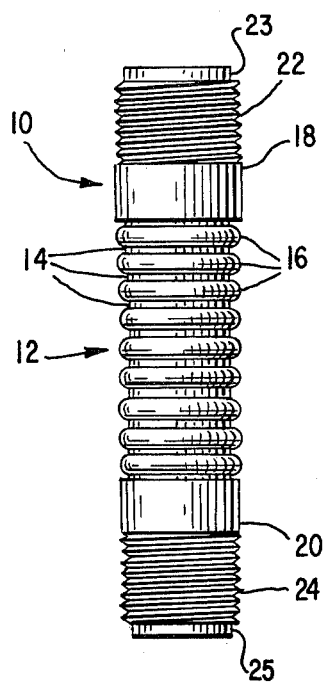
FIG. 1 is a side elevational view of the resilient and flexible sprinkler nipple.

Numeral 10 in FIG. 1 designates generally a resilient plastic nipple which may be used for coupling a sprinkler head to a sprinkler system pipeline. The nipple is an elongated, plastic tube preferably constructed from a low density, copolymerized polyethylene or polyurethane material such as DuPont's elvax or UpJohn's polyester 2102. In addition to being resilient, the plastic is protected from deteriorating due to ultraviolet radiation or oxidation by ultraviolet light stabilizer and color concentrate additives which are blended into the material.

Figure 4:
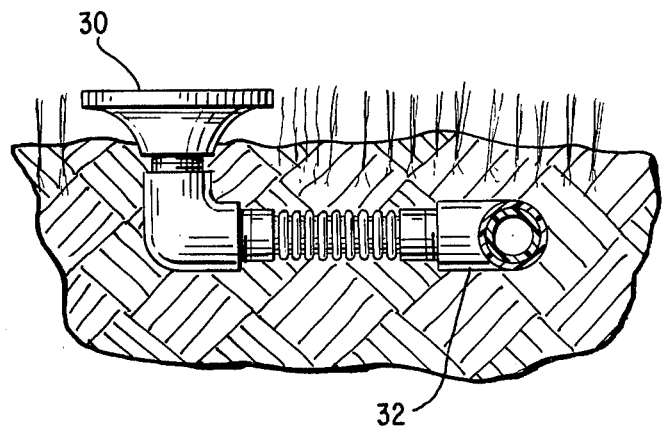
FIG. 4 is a side view of the resilient nipple in a horizontal position coupled to a sprinkler head and a T-joint.
Figure 2:
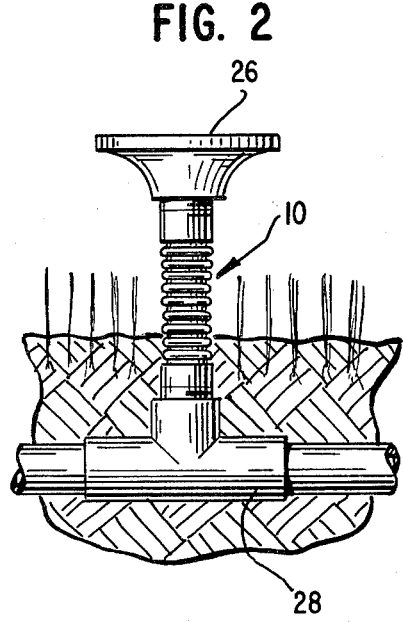
FIG. 2 is a side elevational view of the resilient nipple in a vertical position coupled to a sprinkler head and a T-joint beneath the ground.

The nipple includes a resilient center section 12 being defined by a uniform set of annular undulations shown by concave portions or recesses 14 and convex portions or protrusions 16. In the preferred embodiment, center section 12 can maintain its flexibility down to minus 100 degrees fahrenheit and has a tensile strength of at least 1600–2100 psi. A pair of rigid portions 18 and 20 adjacent the center section 12 provide support to exterior threaded sections 22 and 24, respectively. Snub portion 23 is adjacent the other end of threaded section 22 and annularly recessed from the outermost extension of threaded section 22. Similarly, snub portion 25 is adjacent the other end of threaded section 24 and annularly recessed from the outermost extension of threaded section 24. Threaded sections 22 and 24 combine with snub portions 23 and 25, respectively, for mating with connector fittings on sprinkler head 26 and T-joint 28. Such a coupling may be made simply by hand screwing the threaded portion 24 into T-joint 28, and then hand screwing sprinkler head 26 onto threaded portion 22. Nipple 10 may also be horizontally positioned for coupling between a sprinkler head 30 and pipeline 32, as depicted by FIG. 4.

In the preferred embodiment, protrusions 16 do not extend outwardly any further than the outermost annular extensions of threaded sections 22 and 24 and rigid portions 18 and 20. In other words, threaded sections 22, rigid portions 18 and 20 and protrusions 16 are longitudinally linear. This design enables the main section 12 to function in conjunction with threaded sections 22 and 24.

The center section 12 has sufficient rigidity to maintain the entire plastic nipple tube in an upright, vertical position under the normal operation of a sprinkler system. The annular set of concave portions or recesses 14 and convex portions or protrusions 16 enables the nipple 10 to bend or deflect up to 180 degrees in any direction and subsequently return to its original position. Recesses 14 and protrusions 16 combine to provide both flexibility and rigidity. The thin walls of concave portions 14 are designed for flexibility. When a force is reached which might begin to pull or strain threaded portion 22 or 24, the walls of recesses 14 give so that main section 12 will bend. The thicker walls of convex portions 16 are designed for strength and stability. The convex portions 16 do not protrude outwardly any further than the sections 18 or 20. The rigidity created by convex portions 16 enables the bent main section 12 to return to its original position after the force applied to the nipple is removed. Therefore, the annular shape of the convoluted main section 12 is designed to provide maximum psi strength capability with the most efficient yield and supportive characteristics.

Figure 3:
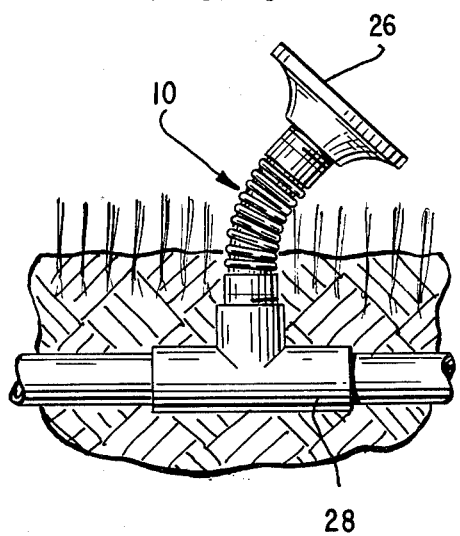
FIG. 3 is the nipple of FIG. 2 in a deflected position.

When a deflecting force is applied to either the sprinkler head or the plastic nipple 10, and the deflecting force is greater than the rigidity of the center section 12, the resilient center section 12 will bend, as shown in FIG. 3, in response to such a deflecting force. The nipple remains bent so long as an excessive deflecting force is applied thereto. As the deflecting force decreases below the excessive threshold level, the center section 12 will rebound to its upright, vertical position. Similarly, when the nipple 10 is maintained in a horizontal position between the sprinkler head and pipeline, as shown by FIG. 4, it will also bend or deform (not shown) as excessive force is applied and return to its original position as the force decreases below the excessive threshold level.

The threads of threaded sections 22 and 24 are oversized, approximately 0.020 inches in the preferred embodiment, and the angle of pitch is narrower, approximately 0.005 inches, than a standard, national threaded pipe. In addition, the threaded sections 22 and 24 are shorter in length than a standard, national pipe threadings. The oversized threads and the narrower angle of pitch are designed to create an extra interference fit which prevents the threaded sections 22 and 24 from creeping or loosening the connector pipeline. As a result, no sealing components are required to obtain or maintain an effective watertight seal. The seal is further enhanced because the outer ends of portions 18 and 20, respectively are permitted to actually touch the connector fitting. At the same time, sections 18 and 20 are designed to be rigid enough so that threaded sections 22 and 24 will not be completely deflected when nipple 10 is bent. By providing shorter threaded sections 22 and 24, as compared to the standard, national pipe thread length, bottoming out in a fitting is avoided. Consequently, all threads of a threaded section 22 or 24 engage within a connector fitting. Thus, the seal is improved between the nipple 10 and a connector fitting such as T-joint 28.

The snub sections 23 and 25 which are adjacent threaded sections 22 and 24 respectively, provide the nipple 10 with a good lead in for mating with connector fittings. As a result, the possibility of cross-threading the nipple 10 in a connector fitting is minimized.

The nipple 10 is further strengthened while being sufficiently flexible due to the manner in which the plastic tubing embodied by nipple 10 is molded. Instead of performing an injection molding whereby the material is shot from snub portion 23 to snub portion 25 or vice versa, the material is shot into a nipple molding from the center of the main section 12. This method of molding forces the material to flow circularly up the nipple molding in such a manner that a nonlinear molecular orientation of the material is created throughout the nipple. This nonlinear orientation provides nipple 10 with a maximum resistance to flex fatigue.

While in the foregoing, there has been disclosed an embodiment of the invention in considerable detail for the purposes of illustration. It will be understood by those skilled in the art that many of these details may be varied without departing from the spirit and scope of the invention.

What is claimed is:

1. A flexible plastic nipple for coupling a sprinkler head to a sprinkler system pipeline comprising:
    a generally elongated single plastic molded tubular piece having a pair of end sections and a resilient center section defined by an outer wall carrying annular undulations including recesses and protrusions;
    said recesses having relatively thin walls for flexibility and said protrusions having relatively thicker walls for strength and stability so that said center section is sufficiently rigid to maintain said elongated tubular piece in a fixed position under the normal operation of a sprinkler system and is responsive to a deflecting force greater than the rigidity of said center section for bending and for subsequently rebounding to its original position when said deflecting force is removed;
    each end section including a rigid portion, positioned adjacent said center section, a flexible threaded section connected to said rigid portion for mating the nipple with a connector fitting on the sprinkler head or pipeline, and a snub portion connected to said threaded section for leading said threaded section into the connector fitting, said threaded section having sufficient flexibility to prevent rupturing or stripping when a force is transmitted thereto and said center section bending before the force transmitted to said threaded section becomes excessive.

2. The flexible plastic nipple of claim 1 wherein the outermost annular extensions of said center section, said rigid portions, and said threaded sections are longitudinally linear.

3. The flexible plastic nipple of claim 1 wherein the length of each threaded section is shorter than the length of a standardized national pipe threading to avoid bottoming out in the connector fitting.

4. The flexible plastic nipple of claim 3 wherein each said threaded section has threading which is 0.020 inches oversized as compared to standardized national pipe threading, said threading having an angle of pitch which is 0.005 inches narrower than said standardized national pipe threading.

* * * * *